United States Patent [19]

Schwitters

[11] 4,137,973
[45] Feb. 6, 1979

[54] BEET HARVESTER WITH SPRING SYSTEM FOR PROTECTING ITS LIFTER WHEELS AND PADDLE SHAFT

[76] Inventor: Wayne J. Schwitters, Rte. #1, Box 19, Clara City, Minn. 56222

[21] Appl. No.: 743,175

[22] Filed: Nov. 19, 1976

[51] Int. Cl.² .......................................... A01D 19/00
[52] U.S. Cl. ................................................. 171/58
[58] Field of Search ...................... 171/58, 50, 55, 56, 171/57, 59–62

[56] References Cited

U.S. PATENT DOCUMENTS

| 3,010,522 | 11/1961 | Oppel | 171/58 |
| 3,191,686 | 6/1965 | Everett et al. | 171/58 |
| 3,419,084 | 12/1968 | Barows et al. | 171/58 |
| 4,049,058 | 9/1977 | Eisenhardt et al. | 171/58 |

FOREIGN PATENT DOCUMENTS 1936765  1/1970  Fed. Rep. of Germany ............. 171/58

Primary Examiner—Russell R. Kinsey
Attorney, Agent, or Firm—Peterson, Palmatier, Sturm & Sjoquist, Ltd.

[57] ABSTRACT

A preferred number of lifter wheel assemblies each have a pair of lifter wheels rotatably carried at one end of a strut which is pivotally mounted at its other end to a clamp unit having a horizontal flange which projects forwardly past the front transverse beam of the main frame of the sugar beet harvester. An elongated rigid member is welded to the underside of each strut and has a flange at its forward end which projects beneath the clamp unit flange. Heavy-duty coil springs normally maintain the flanges together to cause the lifter wheels to be biased into the ground. Each spring individually yields or compresses when the lifter wheels associated therewith ride upwardly over a submerged rock, thereby preventing breakage of any of the components constituting the lifter wheel assembly. Sufficient upward movement of the lifter wheels in any given instance would cause the lifter wheels to strike the overhanging steel shaft carrying the paddles that knock the sugar beets from the various pairs of lifter wheels. Breakage of the paddle shaft is prevented by journalling the ends of the paddle shaft on arms pivotally mounted to the side portions of the main frame. Additional heavy-duty springs, one for each arm, normally bias the ends of the arms downwardly, these being the ends of the arms near which the paddle shaft is journaled, so that the last-mentioned springs yield or compress to permit upward movement of any one of the struts and its lifter wheels when deflected upwardly by a rock.

18 Claims, 5 Drawing Figures

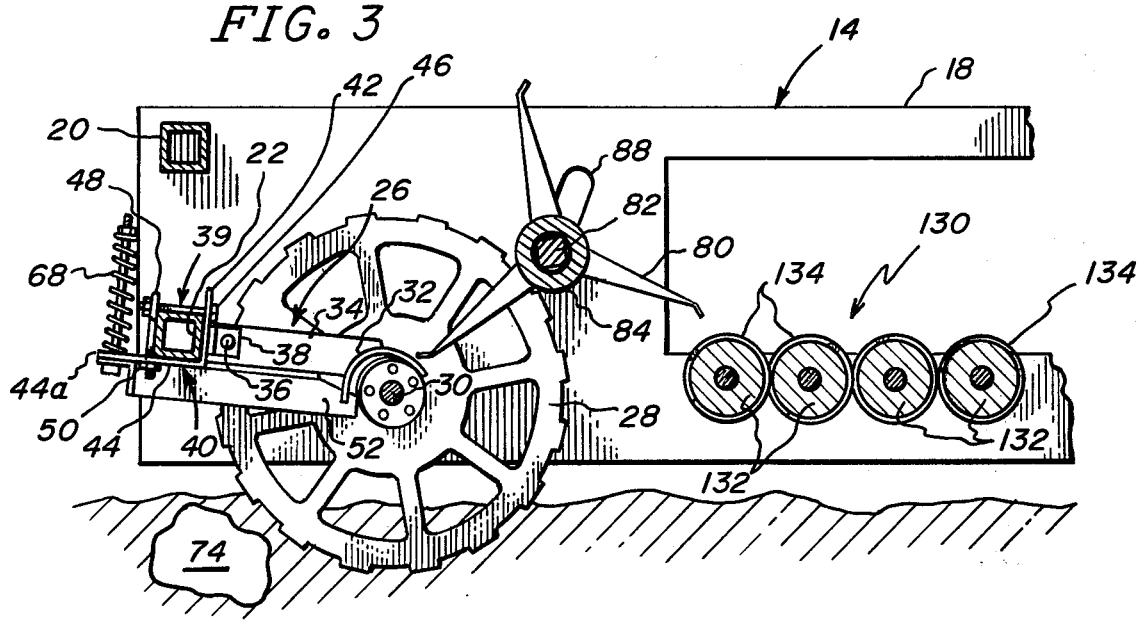
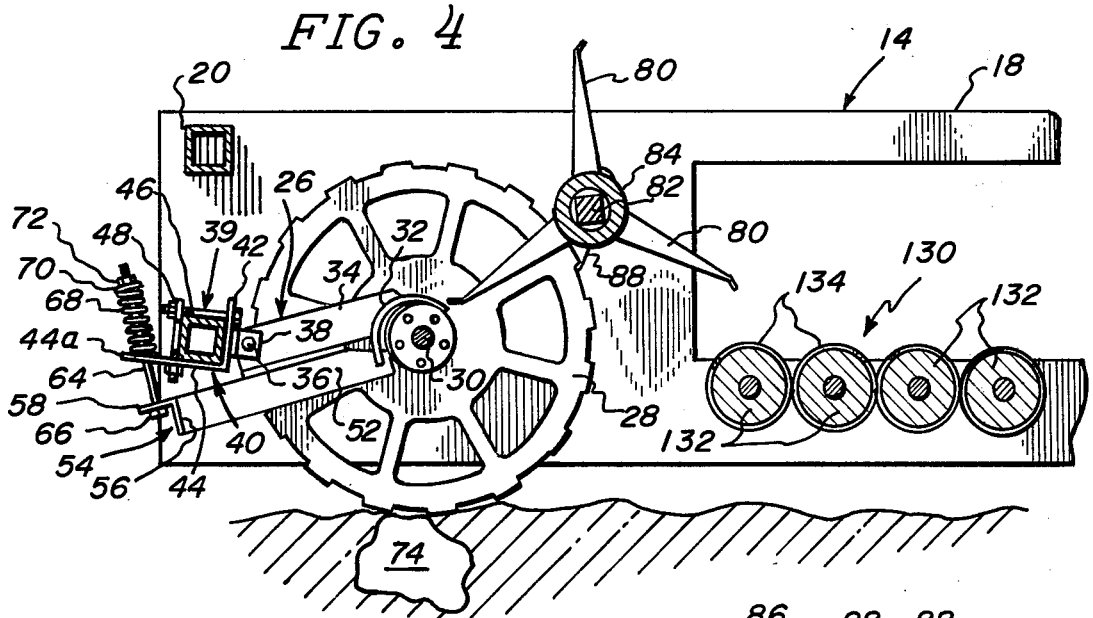
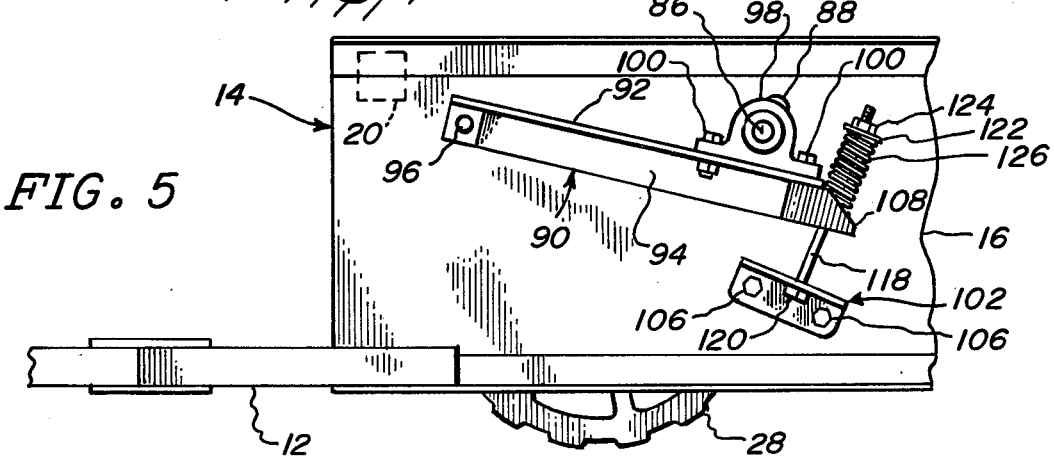

BEET HARVESTER WITH SPRING SYSTEM FOR PROTECTING ITS LIFTER WHEELS AND PADDLE SHAFT

BACKGROUND OF THE INVENTION

1. Field of the Invention

This invention relates generally to sugar beet harvesters, and pertains more particularly to a spring system for protecting the lifter wheels, paddles and components associated therewith when the lifter wheels are deflected upwardly by a submerged rock.

2. Description of the Prior Art

Although the digging of sugar beets is done at a rather shallow depth (three to four inches being normal), nonetheless the encountering of rocks is sufficiently frequent so as to prove annoying to the farmer because of the cost of replacement parts and the time he must spend in the field making repairs. Whereas the frequency of striking rocks is not as great as in some situations, the weight of sugar beet harvesters renders the harvester especially vulnerable to breakage when a rock is struck. Largely because of this, and the intricate design of sugar beet harvesters, manufacturers of sugar beet harvesters have ignored the problem and have simply left it up to the individual farmer to take care of the problem as it arises. Of course, some farmers are troubled more than others, for subsoil conditions vary quite widely as far as sugar beet fields are concerned. Where rocks do have a habit of working themselves upwardly in a given field, that particular farmer experiences a considerable amount of down time and the need exists for a simple system that will adequately safeguard against breakage caused by submerged rocks.

SUMMARY OF THE INVENTION

Accordingly, a general object of the invention is to provide a system that will protect the lifter wheel assemblies from breaking when the wheels strike a submerged rock. More specifically, the invention envisages the continued use of lifter wheel assemblies in substantially the same form as currently being manufactured but incorporate a sufficient change in the structural arrangement so that the strut on which the lifter wheels are carried is spring biased downwardly, the spring yielding when the wheels hit a submerged rock so that the wheels can move upwardly without imposing undue loads on any of the components comprising the lifter wheel assembly.

Another object of the invention is to provide a spring system that also protects the paddles, particularly the paddle shaft, which overlies each lifter wheel assembly. The paddles, it will be appreciated, knock the beets from between the lifter wheels after the wheels have elevated the beets sufficiently above the ground. More specifically, when there is a sufficient upward movement of one or more of the lifter wheel assemblies owing to the deflective force produced by the submerged rock, the resulting upward movement of the wheels cause their peripheral edges, which are quite sharp, to strike the overlying shaft on which the paddles are mounted. Stated somewhat differently, an aim of the present invention is to correct one breakage problem and concomitantly avoid creating a secondary breakage problem as a result of the avoidance of the primary problem. This is achieved by a spring action which permits the paddle shaft to be urged upwardly when engaged by any pair or pairs of lifter wheels. Protective sleeves on the paddle shaft prevent the paddle shaft, even though capable of moving upwardly when struck, from being cut by the sharp wheel edges.

A further object of my invention is to provide a protective system for beet harvesters as far as safeguarding certain parts from breakage when encountering submerged rocks which will not adversely affect the operation of the harvester. Hence, my invention enables the harvester to operate in the same efficient manner for which it is designed and yet automatically accommodate for the deflective movement caused by a submerged rock.

Still another object is to provide a protective system of the foregoing character which will automatically return to its normal operating condition once the harvester has moved beyond the submerged rock. More specifically, an aim of the invention is to provide a resilient means for returning the lifter wheels to the same depth that they were prior to the rock impingement, and at the same time to return the paddles to their normal position between each pair of lifter wheels, all without any damage taking place.

Yet another object of the invention is to provide a protective system for safeguarding lifter wheels and paddles, as well as the paddle shaft, of a sugar beet harvester which will be relatively inexpensive to install by the manufacturer on original equipment, and which will permit harvesters that have already been sold and in use to be readily modified so that the benefits of my invention can be realized by those farmers who have already made a substantial investment in beet harvesting equipment. Actually, it is an aim of my invention to permit use of my protective system with various types of beet harvesters irrespective of their particular design or manufacturer, the low cost encouraging its widespread use, both on original equipment and equipment already in service.

Briefly, my invention comprises the pivotal mounting of each strut of a lifter wheel assembly so that the lifter wheel assembly is capable of being deflected upwardly when a rock is struck while performing a beet digging operation. Whereas the lifter wheels can be deflected upwardly, heavy coil springs act against two flanges to bias the strut of the lifter wheel assembly in a direction so that the lifter wheels are urged into the ground so that the lifter wheels normally function in their intended manner to dig sugar beets. Once the sugar beet has been elevated above the ground by a pair of lifter wheels, it is the responsibility of the steel paddle disposed for rotation between upper portions of that pair of lifter wheels to knock the sugar beet rearwardly onto a cleaning bed from which it travels, along with others, to an elevator extending upwardly to one side of the harvester.

BRIEF DESCRIPTION OF THE DRAWINGS

FIG. 3 is an enlarged sectional view taken in the direction of line 3—3 of FIG. 1 showing a lifter wheel and paddle in the position they normally assume before the lifter wheel has struck the submerged rock that appears;

FIG. 4 is a view corresponding to FIG. 3 but showing the wheel deflected upwardly by the rock and the resulting deflection of the paddle shaft made possible by my invention, and FIG. 5 is an enlarged fragmentary side elevational view taken in the direction of line 5—5 of FIG. 1 for the purpose of depicting one of the coil springs that normally biases the paddle shaft downwardly to cause the various paddles mounted thereon to assume an operative relationship with the various pairs of lifter wheels.

DESCRIPTION OF THE PREFERRED EMBODIMENT

Figure 1:
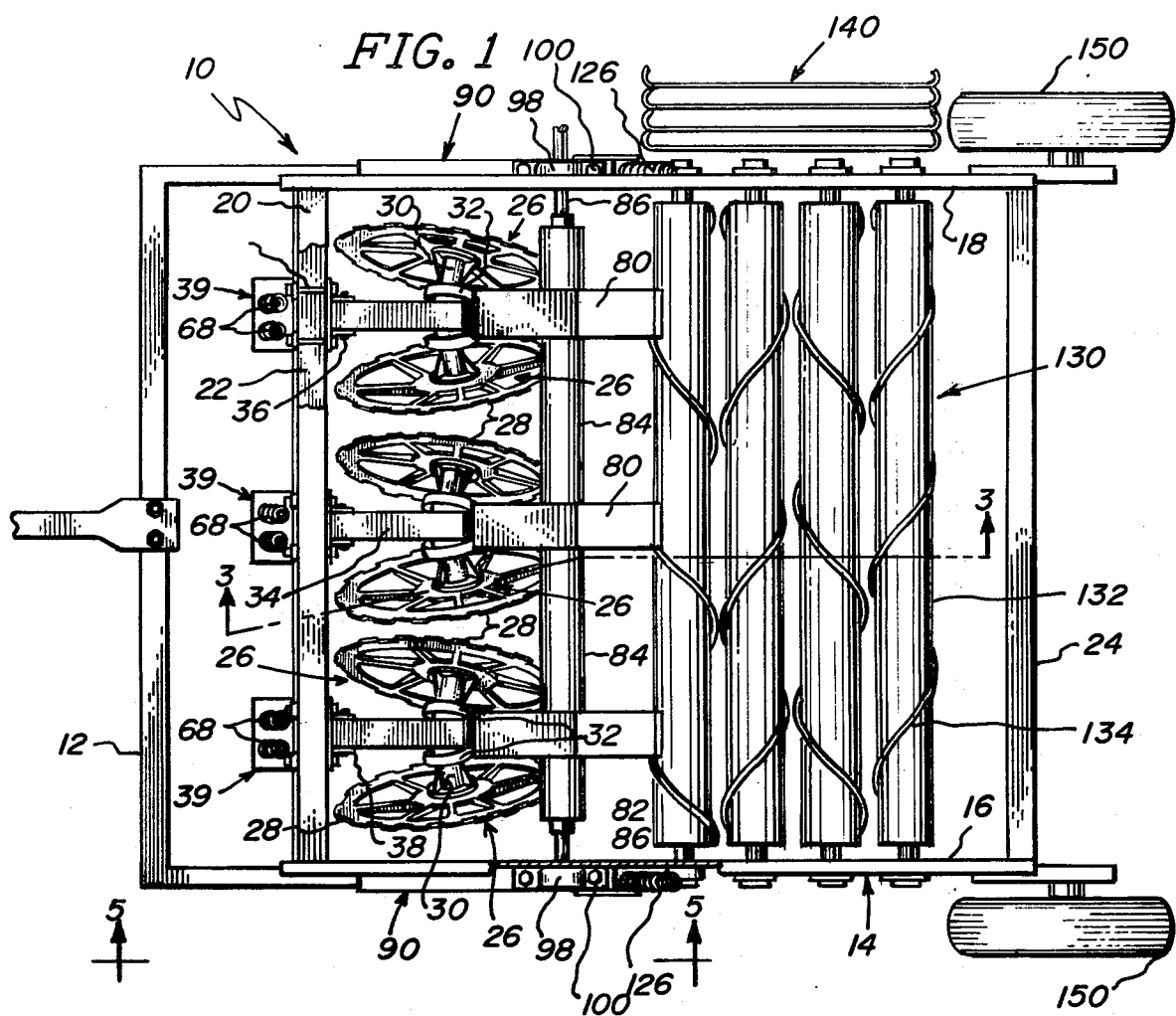
FIG. 1 is a top plan view of a somewhat diagrammatically pictured three row sugar beet harvester exemplifying my invention.

Referring to FIG. 1, a typical sugar beet harvester 10 has been rather diagrammatically presented. In this regard, it will be recognized that sugar beet harvesters vary somewhat as to their design, depending largely on the particular manufacturer. Therefore, no need is seen to show all of the features that are generically common to various sugar beet harvesters currently available.

Figure 2:
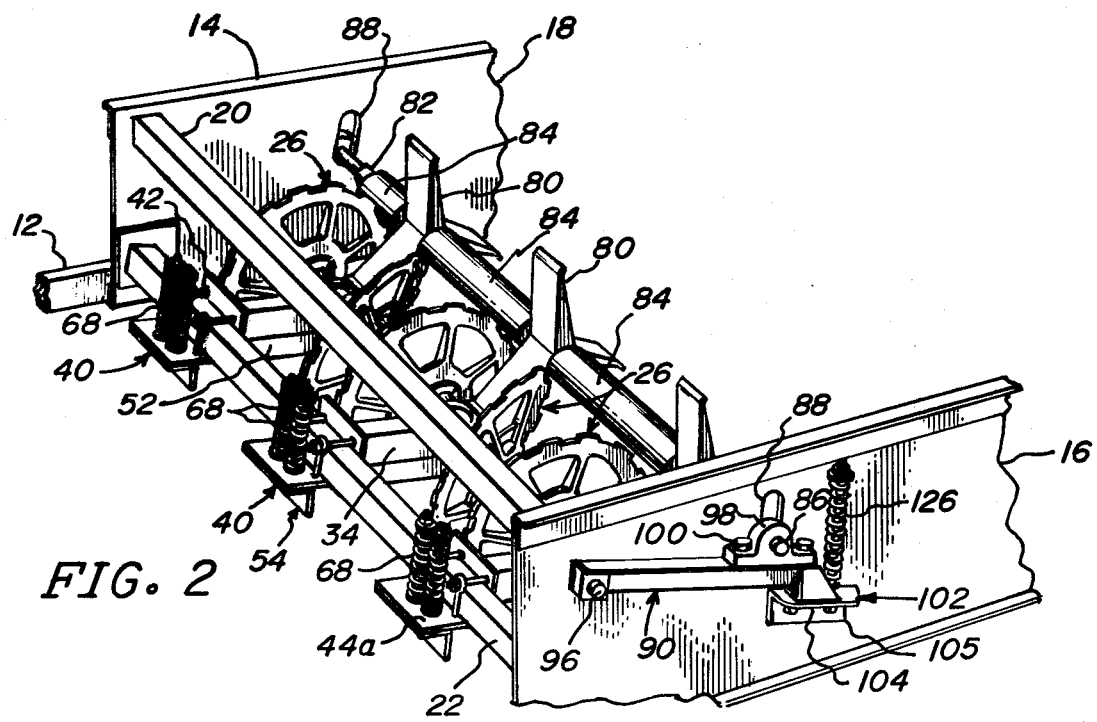
FIG. 2 is a perspective view of a portion of the harvester shown in FIG. 1 for the purpose of better illustrating my protective spring system.

With the thought in mind of keeping the drawings as simple as possible, as explained above, the harvester 10 has been pictured with a drawbar 12 having a forwardly directed drawbar extension which is connected to the rear of the tractor (not shown). The drawbar 12 connects with a rectangular main frame unit 14 comprising parallel plate-like side frames 16 and 18, a front upper transverse beam 20 and a front lower transverse beam 22 (FIG. 2) and an upper rear transverse beam 24, there being no need to depict the lower transverse beam which is directly beneath the rear beam 24.

It will be recognized by those familiar with sugar beet harvesting that it is customary to harvest three to six rows at a time. For the sake of drafting simplicity, the harvester 10 has been shown with only three (one for each of three rows) lifter wheel assemblies 26, each having a pair of lifter wheels 28 rotatably carried on stub shafts 30 projecting angularly from a bearing housing 32 integral with the rear end of an elongated strut 34. At the forward end of the strut 34 is a pivot pin 36 extending transversely therethrough and also through a clevis 38 on a clamp unit 39 comprising an angle member 40 composed of a vertical flange 42 and a horizontal flange 44, the flange 44 having a portion 44a projecting past the forward face of the transverse beam 22. The clamp unit 39 further includes a pair of forwardly extending bolts 46 which extend over the top face of the transverse beam 22, and through a pair of holes in the vertical flange 42. The forward ends of the bolts 46 extend through the eyes of a pair of eyebolts 48 extending downwardly through two holes in the horizontal flange 44. Nuts 50 on the lower ends of the eyebolts 48 when tightened hold the particular clamp unit 39 in whatever lateral position on the transverse beam 22 that is most appropriate for the particular spacing of the sugar beet rows. In this regard, it will be appreciated that the strut 34 extends rearwardly from the vertical flange 42, being pivotally connected thereto by reason of the clevis 38 and pin 36, and the positioning of the clamp unit, the flange 42 being a part thereof, determines the location of the trailing lifter wheels 28 so that they straddle the beets forming that particular row.

Playing an important role in the practicing of my invention is a rigid tubular member 52 having a square cross section, the member 52 in each instance being welded to the underside of the strut 34 with which it is associated. Of course, there is one strut 34 included in each assembly 26. The member 52 extends beneath the horizontal flange 44 of the angle member 40 and has welded to its forward end an angle member 54 composed of a vertical flange 56 and a horizontal flange 58. Actually, it is the backside of the vertical flange 56 that is welded to the forward end of the square tube 52. As can be understood from FIGS. 3 and 4, the projecting portion 44a which is integral with the horizontal flange 44 has a pair of holes therein and the horizontal flange 58 has a pair of holes therein which are in alignment directly beneath the holes in the flange 44. A pair of relatively long bolts or rods 64 having a head 66 thereon extend upwardly through the holes of both flanges 44, 58, then continuing axially through a pair of heavy-duty coil springs 68. The upper ends of the bolts or rods 64 extend through washers 70 of sufficient size so as to overlie the upper end of each coil spring 68. By means of nuts 72 threaded onto the upper ends of the bolts or rods 64, the coil springs 68 can be initially compressed to whatever degree provides the best biasing action for the lifter wheels 28.

Before continuing, it might be well at this point to show a submerged rock 74 in FIG. 4 (which also appears in FIG. 3). This rock 74 is deflecting the lifter wheels 28 of one of the lifter wheel assemblies 26 upwardly with the consequence that the strut 34 is being rotated in a counterclockwise direction. Inasmuch as the rigid tubular member 52 is fixedly secured to the underside of the strut 34, it, too, rotates in a counterclockwise direction to cause the flange 58 to move downwardly. The flange 44 cannot move downwardly and neither can its projecting portion 44a, for it constitutes part of the clamp unit 39 that has been fixedly anchored to the transverse beam 22. Consequently, the underside of the flange 58 acts against the heads 66 of the bolts or rods 64 to pull the bolts or rods 64 downwardly. The upper ends of the bolts or rods 64 act against the upper end of the coil springs 68 by reason of the washers 70 and the nuts 72 so that the coil springs 68 are compressed, the degree of compression or yielding depending upon how much the wheels 28 are deflected upwardly. In other words, the two flanges 58, 44 separate (FIG. 4) and the separation compresses the coil springs 68 to absorb the reaction resulting from the deflection caused by the rock 74. Once the harvester 10 passes beyond the rock the coil springs 68 immediately return the wheels 28 to the same depth that they were at before the rock 74 was encountered (see FIG. 3). Stated somewhat differently, the coil springs 68 automatically re-establish the depth of wheels 28 that has been previously selected as the optimum depth for harvesting the particular beets. Since the manner in which the lifter wheels 28 dig the beets is conventional, it is not seen that it is necessary to show any beets in the process of being lifted by the wheels 28. It should be mentioned, though, that my invention permits the lifter wheels 28 to function in their normal fashion until a rock is encountered.

At this time, attention is directed to the presence of steel paddles 80 composed of two parts which are secured or mounted on a paddle shaft 82 having a square cross section, bolts being used to effect this mounting. However, since the design of the paddles 80 varies considerably, anyway, the paddles have been simply shown as constructed in one piece. Pipe sections or cylindrical sleeves 84 loosely encircle the shaft 82 between adjacent paddles 80 and adjacent the cylindrical end portions 86 of the shaft which end portions in this instance project through slots 88 in the side frames 16, 18.

An arm 90 at each side of the harvester 10 has a generally horizontal flange 92 and a vertical flange 94, the vertical flange 94 of one of the arms confronting the side frame 16 and the vertical flange 94 of the other arm 90 confronting the other side frame 18. A bolt or pivot pin 96 extends through the vertical flange 94 of each arm 90 to maintain the vertical flange 94 in a confronting relationship with its particular side frame 16, 18. The arms 90 provide support for the cylindrical end portions 86 of the paddle shaft 82, doing so through the agency of pillow block bearings 98; a pair of securing bolts 100 extend downwardly through the horizontal flanges 92 of the arms 90 to anchor the pillow block bearings 98 in place on the arms 90.

Although really only clearly visible in FIG. 5, an angled limit member 102 having a flange 104 and a flange 105, the flange 105 being secured to the side frame 16 by means of bolts 106 passing through the flange 105. A second limit member 102 having a flange 104 is similarly secured to the frame side 18.

Integral with the remote ends of the arms 90, that is the ends farthest from the pivot pins 96, is an adapter or extension 108, the adapter being welded to the arm 90. A hole in the flange 104 and a hole in the adapter 108 are in general alignment with each other and a relatively long bolt or rod 118 having a head 120 extends upwardly through these holes. At the upper end of the bolt or rod 118 is a washer 122 and a nut 124 is threadedly attached to each of the bolts or rods 118, there being one at each side, as is believed evident. Between the adapter 108 and washer 122 is a heavy-duty coil spring 126, the spring 126 encircling the bolt or rod 118 at each side of the frame 14.

Reverting again to FIG. 4, it will be seen that when the lifter wheels 28 strike the submerged rock 74, they are urged upwardly toward the paddle shaft 82 thereabove. If the shaft 82 were not free to move upwardly, it will be appreciated that the steel wheels 28 and shaft 82 would be severely damaged, causing the shaft 82 to be bent in most cases. However, when practicing my invention, any upward movement of the wheels 28 will act against the shaft 82 thereabove to cause the entire shaft 82 to be forced upwardly. The pipe sections or sleeves 84 prevent the sharp edges of the lifter wheels 28 from engaging and cutting into the paddle shaft 82, the shaft 82 being free to turn inside the sleeves 84 without being cut by the sharp wheel edges. The coil springs 126, there being one in each side, compress sufficiently so as to permit the shaft to move enough so that no damage is done to the paddle 80 or to the shaft 82.

It will be recognized that the spring strength of the coil springs 126 is considerably less than the spring strength of the coil springs 68 for whatever pair of wheels 28 is being deflected. It will also be understood that the various coil springs 68, there being two (or more if necessary) for each wheel assembly 26, must be sufficiently strong so as to return the particular lifter wheels 28 that have been deflected back to the depth at which they have been set for harvesting. The coil springs 126, however, do not have to impose anywhere near the degree of returning force to the shaft 82, for all that the springs 126 are required to do is to simply reposition the shaft 82 and its paddles 80 between the particular pair of lifter wheels 28 that they are intended to coact with. The paddles 80, as conventional, knock the elevated or lifted beets from between the particular pair of lifter wheels 28 that has performed the digging operation for that beet.

Although not associated with my invention, for the sake of completeness, it can be pointed out that the beets when dislodged by the paddle wheels 80 are thrust rearwardly onto a cleaning bed 130 composed of rolls 132 having spiral ribs 134 thereon. From the rolls 132 the various beets (not shown) move laterally to the lower end of an elevator 140. Also for the sake of completeness, a pair of rear wheels 150 have been depicted. It will be understood that the drawbar 12 maintains the front end of the harvester 10 at the appropriate elevation to provide the desired depth for the lifter wheels 28.

I claim:

1. In a sugar beet harvester, frame means including a transverse beam, an elongated strut, means pivotally attaching one end of said strut to said transverse beam so that said strut is angularly movable in a plane generally perpendicular to said beam, a pair of lifter wheels rotatably carried at the other end of said strut, and means connected to said strut and said beam for resiliently biasing said strut in a direction to cause its said other end, together with said lifter wheels, to move toward the ground during the digging of sugar beets.

2. A sugar beet harvester in accordance with claim 1 in which said pivotally attaching means includes a member having a pair of angularly directed flanges, said one end of the strut being pivotally connected to one of said flanges.

3. A sugar beet harvester in accordance with claim 1 in which said first rigid means includes a first rigid member fastened to said one end of said strut and including a second rigid member confronting the projecting portion of said second rigid means, said second rigid member constituting said projecting portion of said first rigid means and said spring means having one end thereof engaging the projecting portion of said second rigid means, and means connecting the other end of said spring means to said second rigid member.

4. A sugar beet harvester in accordance with claim 2 in which said one flange is vertical and said other flange is horizontal, and a flange on said strut extending beneath said horizontal flange.

5. A sugar beet harvester in accordance with claim 4 in which said resilient means includes at least one coil spring having one end abutting said horizontal flange, a bolt or rod member extending axially through said coil spring, one end of said bolt or rod being anchored to the other end of said coil spring and the other end of said bolt or rod being anchored to said flange on said strut, whereby upward movement of said other end of the strut due to deflection of said lifter wheels by a submerged rock causes said lower flange to move downwardly away from said horizontal flange to compress said spring.

6. A sugar beet harvester in accordance with claim 5 in which said pivotally attaching means further includes a clevis integral with said vertical flange and a transverse pivot pin extending through said clevis and through said one end of said strut.

7. A sugar beet harvester in accordance with claim 6 in which said vertical flange confronts the rear side of said transverse beam and said horizontal flange confronts the bottom side, said horizontal flange and said flange both extending forwardly from the forward side of said transverse beam.

8. A sugar beet harvester in accordance with claim 1 including a rotatable paddle shaft, vertically movable means mounted on said frame means for supporting said shaft for rotation about a transverse axis above said lifter wheels, and resilient means mounted on said frame means normally resiliently biasing said means for supporting said shaft to urge said shaft downwardly.

9. A sugar beet harvester in accordance with claim 8 in which said shaft supporting means includes a pair of arms, one arm being pivotally connected to one side of said frame means and the other arm to the other side of said frame means, said shaft being rotatably supported by said arms near the other ends thereof.

10. A sugar beet harvester in accordance with claim 9 including a flange adjacent the said other end of each arm and a stop flange secured to said frame means beneath each of said arm flanges for limiting downward movement of said arm flange.

11. A sugar beet harvester in accordance with claim 10 in which said second resilient means includes first and second coil springs, one end of said first and second coil springs having one end abutting said arm flange in each instance, a bolt or rod extending axially through each of said first and second coil spring, one end of one of said last-mentioned bolts or rods being anchored to the other ends of said first and second coil springs, whereby said first and second coil springs are compressed when said paddle shaft is moved upwardly by said lifter wheels.

12. A sugar beet harvester in accordance with claim 11 in which said frame means has an opening in each side thereof, said paddle shaft extending through said openings, and a bearing unit on each arm for journalling the ends of said paddle shaft.

13. A sugar beet harvester in accordance with claim 8 including a plurality of sleeve members encircling said shaft, whereby the peripheral edges of said wheels stike said sleeves rather than the shaft.

14. A sugar beet harvester in accordance with claim 13 in which said shaft has a square cross section and said sleeves have a circular cross section.

15. In a sugar beet harvester, frame means including a transverse beam, an elongated strut, means pivotally attaching one end of said strut to said transverse beam so that said strut extends generally in one direction from said beam and is angularly movable in a plane generally perpendicular to said beam, a pair of lifter wheels rotatably carried at the other end of said strut, first rigid means fastened to said strut and extending beneath said transverse beam having a portion thereof projecting beyond said beam in a direction generally opposite to said one direction, second rigid means fastened to said transverse beam having a portion projecting beyond said beam in said generally opposite direction at an elevation above the projecting portion of said first rigid means, and spring means normally urging said projecting portion of said first rigid means upwardly in the direction of the projecting portion of said second rigid means, thereby biasing said strut in a direction to cause its said other end, together with said lifter wheels, to move toward the ground during the digging of sugar beets.

16. A sugar beet harvester in accordance with claim 15 in which said first rigid means is welded to said strut and in which said second rigid means is bolted to said transverse beam.

17. A sugar beet harvester in accordance with claim 15 in which the projecting portion of said first rigid means engages the projecting portion of said second rigid means to limit downward movement of said strut in said generally perpendicular plane.

18. In a sugar beet harvester, frame means including a transverse beam, an elongated strut pivotally connected at one end to said transverse beam so as to be angularly movable in a plane generally perpendicular to said beam, a pair of lifter wheels rotatably carried at the other end of said strut, a coil spring, first rigid means fastened to said transverse beam having a portion thereof extending beneath one end of said coil spring, and second rigid means fastened to said strut having a portion thereof extending beneath said first rigid means portion, and rod means anchored at one end to said second rigid means portion, and means anchored to the other end of said rod means for compressing said coil spring when said strut is urged upwardly during the digging of sugar beets and as a result said second rigid means portion urged downwardly to pull said rod means downwardly and thereby compress said coil spring.

* * * * *